US011470185B2

(12) United States Patent
McCarthy et al.

(10) Patent No.: US 11,470,185 B2
(45) Date of Patent: Oct. 11, 2022

(54) INFORMATION CENTRIC NETWORK PACKET TRANSMISSION CONTROL

(71) Applicant: Intel Corporation, Santa Clara, CA (US)

(72) Inventors: Jessica C. McCarthy, Dublin (IE); Perumal Kuppuudaiyar, Dublin (IE); Radhika Loomba, Maynooth (IE); Lisa Sherin, Dublin (IE); Maruti Gupta Hyde, Portland, OR (US); Eve M. Schooler, Portola Valley, CA (US); Srikathyayani Srikanteswara, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 16/752,398

(22) Filed: Jan. 24, 2020

(65) Prior Publication Data
US 2020/0162582 A1    May 21, 2020

Related U.S. Application Data

(60) Provisional application No. 62/796,488, filed on Jan. 24, 2019.

(51) Int. Cl.
*H04L 67/63* (2022.01)
*H04L 45/302* (2022.01)
(Continued)

(52) U.S. Cl.
CPC ............ *H04L 67/63* (2022.05); *H04L 45/302* (2013.01); *H04L 45/306* (2013.01);
(Continued)

(58) Field of Classification Search
CPC ... H04L 67/327; H04L 45/306; H04L 47/283; H04L 67/2842; H04L 45/302;
(Continued)

(56) References Cited

U.S. PATENT DOCUMENTS

2013/0060962 A1\* 3/2013 Wang .................... H04L 67/327
709/238
2014/0233575 A1\* 8/2014 Xie ......................... H04L 45/44
370/400

(Continued)

OTHER PUBLICATIONS

"Information-Centric Networking Research Group (ICNRG)", https: trac.ietf.org trac irtf wiki icnrg, (Dec. 13, 2019), 5 pgs.

(Continued)

*Primary Examiner* — Yaotang Wang
(74) *Attorney, Agent, or Firm* — Schwegman Lundberg & Woessner, P.A.

(57) ABSTRACT

Devices and techniques for Information Centric Network (ICN) packet transmission control are described herein. An interest (or data) packet may be received at an ICN router. Here, the packet includes quality of service (QoS) information. For an interest packet, the ICN router creates a pending interest table (PIT) entry for the packet. The ICN router determines that it does not have a route for the packet. Thus, if it is an interest packet, there is no forward route in a forwarding information base (FIB). If it is a data packet, there is no corresponding PIT entry. However, after extracting the QoS information from the packet, the ICN router broadcasts the packet in accordance with the QoS information.

24 Claims, 12 Drawing Sheets

(51) Int. Cl.
   *H04L 47/283* (2022.01)
   *H04L 45/745* (2022.01)
   *H04L 67/568* (2022.01)

(52) U.S. Cl.
   CPC .......... *H04L 45/745* (2013.01); *H04L 47/283* (2013.01); *H04L 67/568* (2022.05)

(58) Field of Classification Search
   CPC . H04L 45/745; H04L 43/106; H04L 43/0864; H04L 67/12; H04L 69/22
   See application file for complete search history.

(56) References Cited

U.S. PATENT DOCUMENTS

| | | | | |
|---|---|---|---|---|
| 2016/0087881 | A1* | 3/2016 | Ge | H04L 45/42 709/244 |
| 2017/0264536 | A1* | 9/2017 | Wood | H04L 43/0864 |
| 2018/0019956 | A1* | 1/2018 | Ravindran | H04L 45/7453 |
| 2019/0306233 | A1* | 10/2019 | Compagno | G06F 16/903 |

OTHER PUBLICATIONS

"Named Data Networking", https: named-data.net https: web.archive.org web 20200118194916 http: named-data.net:80 , (Jan. 18, 2020), 8 pgs.

Al-Naday, Mays F, "Quality of service in an information-centric network", 2014 IEEE Global Communications Conference, (2014), 6 pgs.

Gasti, Paolo, "DoS and DDoS in named data networking", 2013 22nd International Conference on Computer Communication and Networks (ICCCN), (2013), 7 pgs.

Jangam, Anil, "Supporting QoS aware Data Delivery in Information Centric Networks draft-anilj-icnrg-icn-qos-00", https: tools.ietf.org html draft-anilj-icnrg-icn-qos-00, (Jan. 15, 2018), 21 pgs.

Lee, A., "Cyber Physical Systems: Design Challenges", 2008 11th IEEE International Symposium on Object and Component-Oriented Real-Time Distributed Computing (ISORC), (2008), pp. 363-369.

Ren, Y, "Congestion control in named data networking—A survey", Comput. Commun., vol. 86, (2016), 11 pgs.

Schneider, Klaus, "A Practical Congestion Control Scheme for Named Data Networking", :ACM-ICN '16: Proceedings of the 3rd ACM Conference on Information-Centric Networking, (Sep. 2016), pp. 21-30.

Wang, Yaogong, "An improved hop-by-hop interest shaper for congestion control in named data networking", Proc. 3rd ACM SIGCOMM Work. Information centric Netw.—ICN '13, (2013), 6 pgs.

Yang, W, "An Interest Shaping Mechanism in NDN: Joint Congestion Control and Traffic Management", IEEE Int. Conf. Commun., vol. 2018, (May 2018), 6 pgs.

\* cited by examiner

INFORMATION CENTRIC NETWORK PACKET TRANSMISSION CONTROL

CLAIM OF PRIORITY

This patent application claims the benefit of priority, under 35 U.S.C. § 119, to U.S. Provisional Application Ser. No. 62/796,488, titled "INFORMATION CENTRIC NETWORK PACKET TRANSMISSION CONTROL" and filed on Jan. 24, 2019, the entirety of which is hereby incorporated by reference herein.

TECHNICAL FIELD

Embodiments described herein generally relate to computer networking and more specifically to information centric network (ICN) packet transmission control.

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
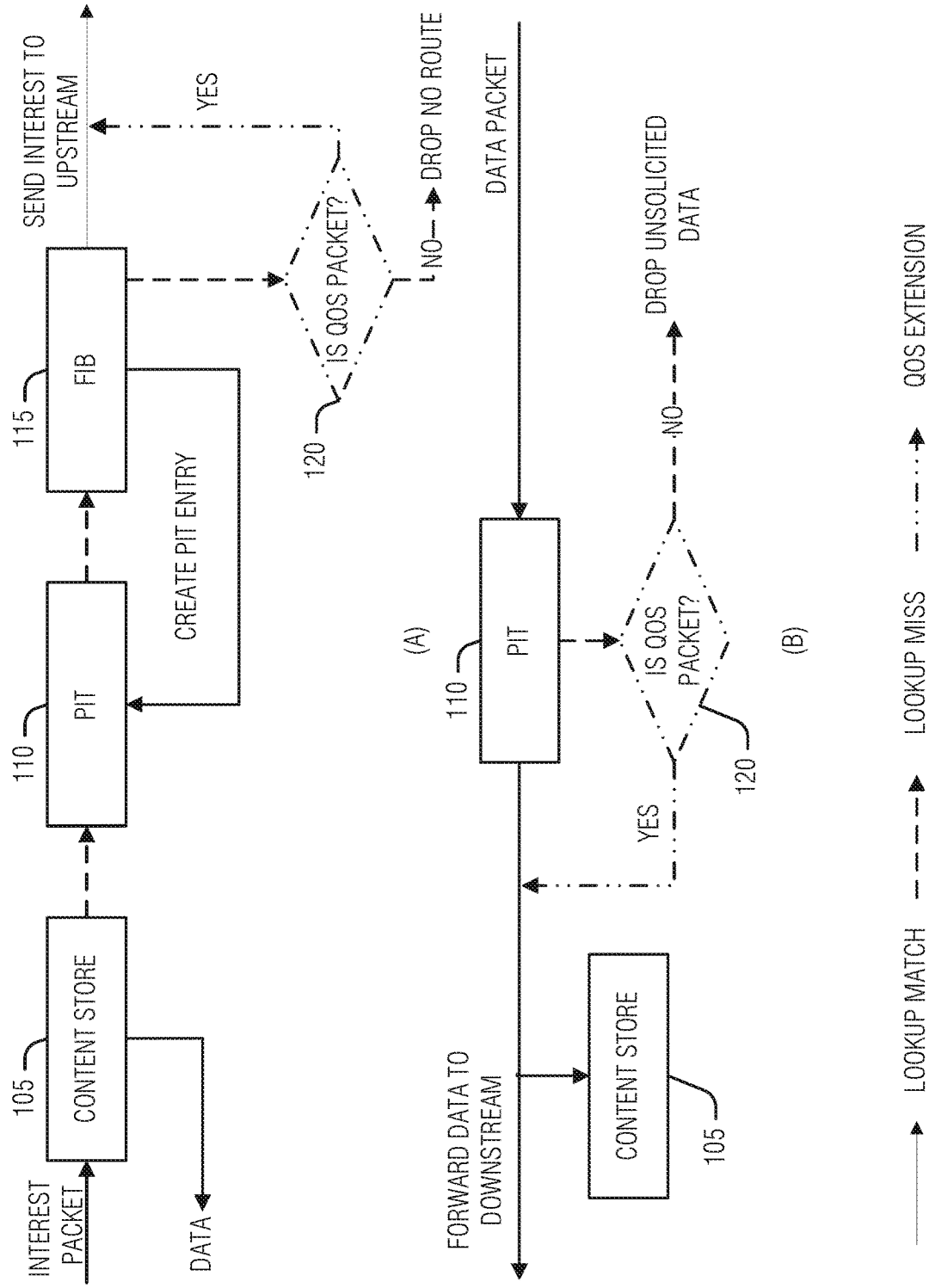
FIG. 1 illustrates an example of a quality of service (QoS) extension on a Named data Network (NDN), according to an embodiment.

Modern cyber physical systems (CPS) may have significant technology that may be used to improve overall system dependability. Using these technologies to improve systems often entails delivery of time-sensitive information between elements of the system. Network capabilities to comprehend and provide guaranteed quality of service for various information types is therefore important for these systems.

Quality-of-Service (QoS) aware data delivery is under-developed in information Centric Networking (ICN). There is little discussion within ICN communities of techniques to ensure that certain quality of service application requirements—such as the reliability of the content delivery, the timeliness of delivery, etc.—are met or stringently adhered to as part of the ICN framework that include highly dynamic applications. In addition, emerging applications—such as autonomous vehicles, augmented reality, industrial robotics, etc., which are expected to benefit from the ICN approach—may contain control loops that are highly sensitive, not only to delay, but also to reliability of error free and sequential data delivery.

A solution for a QoS aware ICN (e.g., for cyber physical systems) is described herein to address the issues noted above. These techniques consider the need to transfer time-sensitive information in a vehicular network (as an example of a cyber physical system) through a reliable and deadline aware process that may use a time-to-live (TTL) value for packet delivery. Also, the QoS information may be used to prioritize different types of information. In an example, application delivery handling requirements are embodied in QoS information present in packets. In an example, a six-bit field may be used to specify Differentiated Services in the packet header. This QoS information is enables the network to classify and manage network traffic to provide a specified quality of service. However, six bits may be too limited to encode QoS information depending upon the application.

In Internet Packet (IP) networks, multiprotocol label switching (MPLS) and Resource Reservation Protocol (RSVP) under the integrated/differential services (IntServ/Diffserv) are applied as extensions over the base protocol to implement QoS concepts. These approaches entail resource reservations at each hop between the content source and content requestor, leading to increased complexity for the network in terms of signaling, flow identification and queue processing. With increasing traffic volumes, such overhead may become prohibitive for IP based networks.

Use of the IntServ/Diffserv approach in IP networks has led to significant scalability issues. The Diffserv fields in the IP header may be very limiting and are only of use in access networks where it is implemented for flow priority. Generally, the same fields are applied to all the data generated by the application. However, there may be parts of a given application layer data stream that may require different services than others (e.g., video vs. audio packets in a video conferencing application). There is currently is no support for such a distinction. This causes network providers to use other techniques, such as deep-packet inspection, to try to determine application specific optimizations. Such determinations may employ a combination of IP source and destination addresses and the TCP/IP ports. In some cases, application headers may be decrypted and parsed to enable classification an appropriate prioritization. Again, these techniques are difficult to scale. Also, because these techniques are generally implemented in hardware due to the high processing requirements, changes or improvements may be costly to implement.

Here. QoS capabilities are added to ICN packets. Being packet based, data differentiation, regardless of connection (e.g., stream) status is inherent. Thus, resource intensive and unreliable deep packet inspection, or the like, is not necessary. The following examples make reference to the named-data-networking (NDN) variant of ICN, but these techniques are also available over other ICN implementations. The following are some features that enable QoS in an ICN:

Interest and data packets may be extended to include Type Length Value (TLV) encoded QoS parameters in a QoS Info part of the packet header.

For interest packet forwarding, the best-route algorithm in an NDN router is extended to extract and evaluate QoS information from the packets to broadcast further in the absence of defined routes.

For data packet return path processing, on the successful evaluation of QoS information, the extension enables the packet forwarding to nodes that weren't on the original interest path, such as a node that has moved away, or a new node that has joined the link in the forwarding path.

The advantages of these enhancements over previous techniques include optimized network utilization and improved QoS that may be delivered to the end-user through the exposure of application QoS requirements to or from the routing layer. In an example, the techniques are implemented in devices that are embedded into network stack software, enabling end users to configure application QoS requirements in network. Additional details are provided below.

As noted above, NDN is a variant of ICN. NDN is a design and reference implementation that offers name-based routing and pull based content retrieval and propagation mechanisms. Generally, a node or device in the network that wants content (e.g., data) sends out an interest packet to its neighboring nodes. The neighboring node(s) that received the content request (e.g., interest packet) will go through a sequence of operations as shown in (A) at the top of FIG. 1. Here the routing node (e.g., ICN router) searches its local content store 105 (e.g., cache) when an interest packet is received. If the content store 105 includes the data named in the interest packet, the data is returned back to requesting node. If the node does not have the requested content in the content store 105, the node checks the Pending interest Table (PIT) 110. If a PIT entry is found for the named content, the node adds the requester (e.g., requesting node) to the entry and waits for the content to arrive from some other node. If the request is new and there is no entry in the PIT 110, the routing node performs a look up in the Forwarding Information Base 115 (FIB) table to fetch the information about the next hop (e.g., an upstream node that may have the named content) to forward the interest packet. Traditionally, when no FIB entry is found, the request is dropped and a no-route NACK (negative acknowledgement (ACK)) message is sent back to the requester. If there is entry in the FIB 115 for the requested information, the node forwards the interest packet further into the network and makes an entry in its PIT 110. When the data packet arrives in response to the forwarded interest packet, the node sends the content back to the original requestor via the interest path as shown in (B) at the bottom of FIG. 1.

FIG. 1 also illustrates an extension to enable QoS aware forwarding. Assuming a wired and static network topology, routes to content producers may be prebuilt and the FIB entries set for information topics (e.g., content names). However, this approach is generally unsuitable for vehicular, or other highly dynamic, environments where nodes (e.g., vehicles, drones, mobile devices, etc.) are mobile and where different content is continually produced by nodes. In these environments, pre-announcing the routes is challenging and resource intensive due to rapidly changing network topology. This may prevent the routing information in the FIB 115 from being up-to-date even with great resource expenditure. When the FIB 115 is stale, interest and data packet routing may be slow, with packets being frequently dropped. Such a state generally makes it difficult for the network to meet deadline aware data delivery (e.g., QoS adherence).

To address these shortcomings of traditional NDN, a QoS extension may be used. Here, the QoS information travels with interest and data packets. In the upstream interest packet case of (A), the FIB determines whether the QoS information is present (operation 120). If no, then the node handles the packet in the same way it would have in a traditional NDN. However, if the QoS information is present, then the node sends the interest packet out of an upstream interface. Here, upstream refers to an interface that is not connected to a requestor. Such a transmission can be thought of as a broadcast because there is a lack of awareness that the content is available on the upstream interface. However, when the QoS information is present, some network inefficiency in terms of traffic is tolerated to reduce latency due to incomplete knowledge of content routes embodied in a stale FIB 115. An analogous operation occurs when data packets are received as illustrated in (B). Specifically, even if a PIT entry does not exist for the data packet, if the data packet has QoS information (operation 120), the data packet is broadcast on out or more downstream interfaces. Here, downstream refers to interfaces generally associated with content consumers, but may be any interface other than the interface upon which the data packet was received.

As noted above, the QoS information is encoded into interest and data packets. In an example, the QoS information may be encoded using a type, length, value (TLV) encoding that enables multiple fields to be contained in a QoS information object into the standard NDN packets (interest or data packets). The QoS information object. In an example, the QoS information includes one or more of priorities, timestamp (e.g., indicating when the packet was created), or a round-trip-time-limit (RTTL) as shown in the FIGS. 2 and 3. These fields may be combined to control time (e.g., latency) sensitive routing with different priority classifications. The QoS information is used to inform ICN routers that QoS marked requests are treated differently. In an example, this different treatment includes changing existing NDN best-route techniques to broadcast the QoS packet when the timestamp and RTTL indicates that the data is still viable and to drop the packets even with a route when the request has expired according to the timestamp and RTTL.

Figure 2:
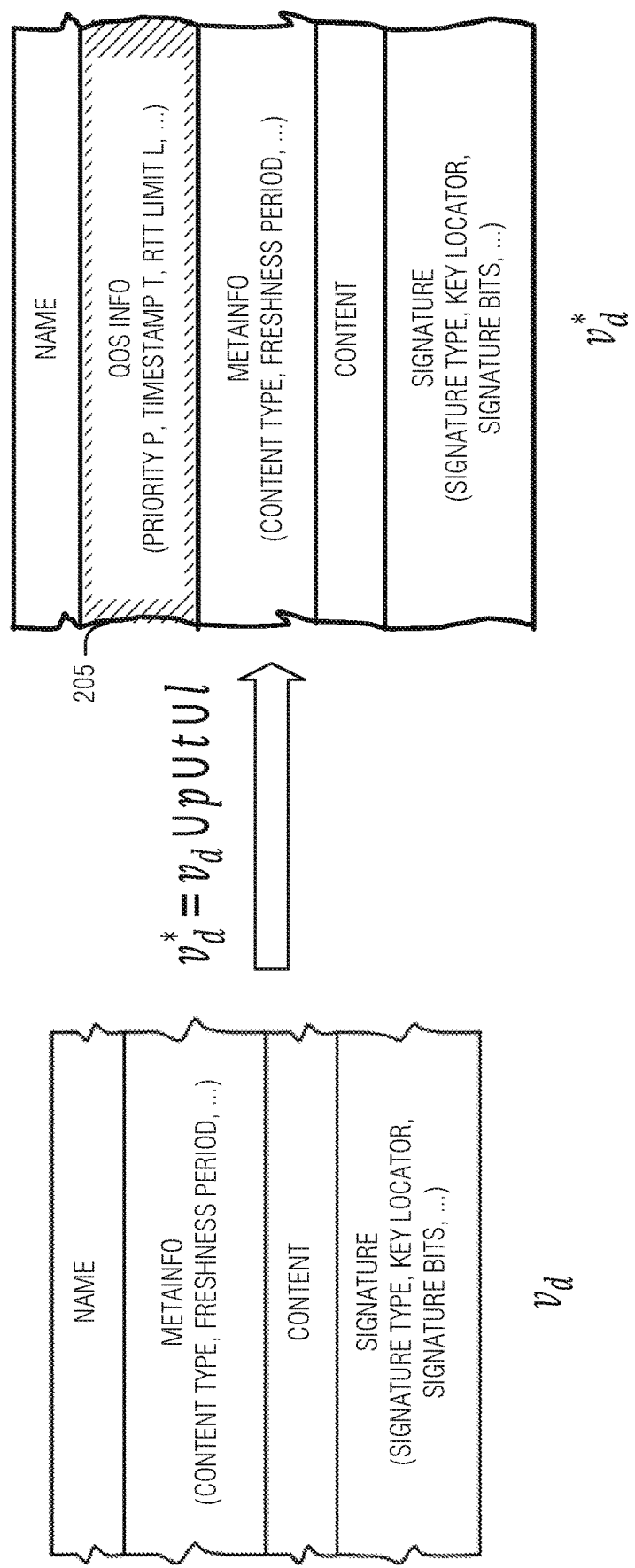
FIG. 2 illustrates an example of a QoS extension to an NDN interest packet, according to an embodiment.
Figure 3:
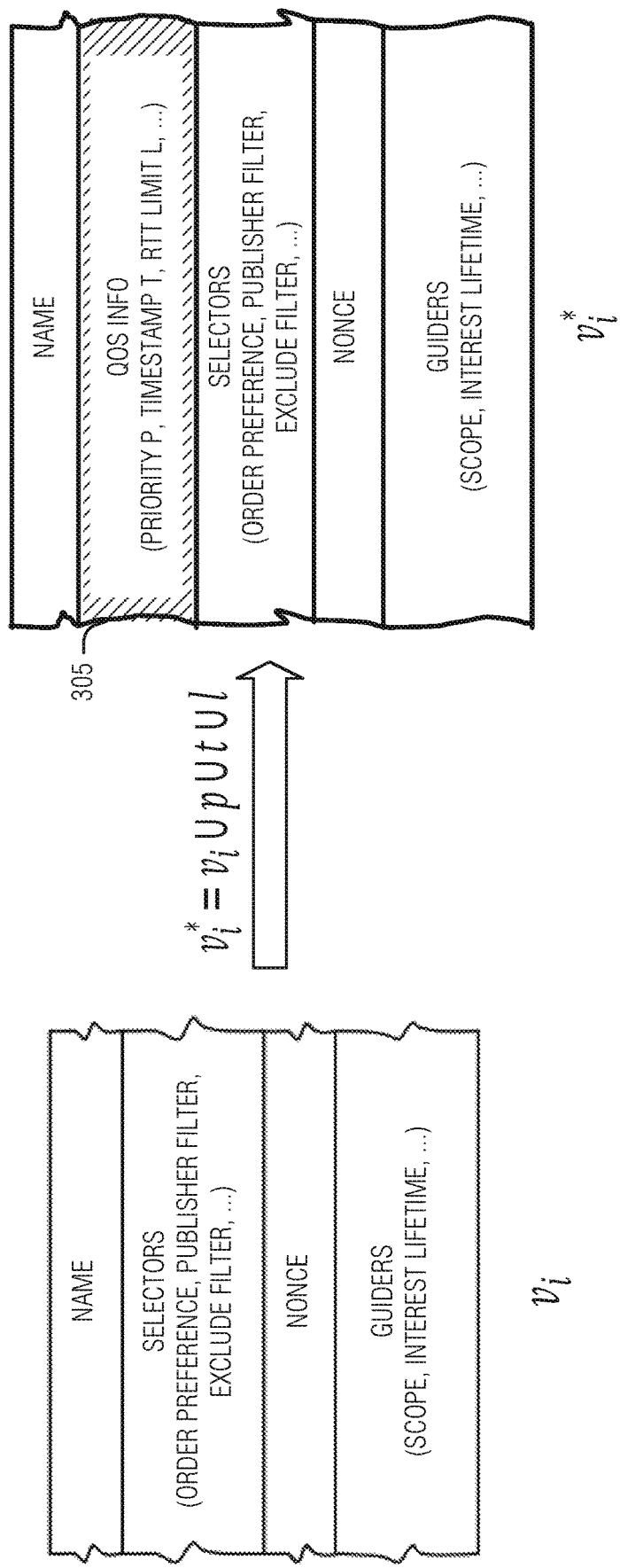
FIG. 3 illustrates an example of a QoS extension to an NDN data packet, according to an embodiment.

As illustrated in FIGS. 2 and 3, NDN packet extensions to include QoS information (e.g., data packet QoS 205 and interest packet QoS 305). The data packet is illustrated in FIG. 2 as vd for the original, and vd* for the extended data packet including the QoS information 205. As illustrated in FIG. 3, an interest packet is represented as vi for the original and vi* for the extended packet including the QoS information 305. The following technique may be used (e.g., in operation 120) for QoS aware interest forwarding and data forwarding:

| Interest Forwarding | Data Forwarding |
|---|---|
| If p ∈ $v_i$* {     timeToLive=         l-currentTime-t;     If (timeToLive ≤ 0):         DROP_PACKET( ) } If p ∈ $v_i$* and     FIB_Entry($v_i$*)!= null: FORWARD(Interface_In_FIB) If p ∈ $v_i$* and     FIB_Entry($v_i$*)== null:     FORWARD(         Interface_Incoming) If p ∉ $v_i$* and     FIB_Entry($v_i$*)== null:     SEND_NACK(No_Route) | If p ∈ $v_d$* {     timeToLive=         l-currentTime-t;     If (timeToLive ≤ 0):         DROP_PACKET( ) } If p ∈ $v_d$* and     PIT_Entry($v_d$*)!= null: FORWARD(         Interface_In_PIT) If p ∈ $v_d$* and     PIT_Entry($v_d$*)== null:     FORWARD(         Interface_Incoming) If p ∉ $v_d$* and     PIT_Entry($V_d$*)== null:     SEND_UNSOLICITED( ) |

In the above technique, l represents the time limit in milliseconds assigned to priority class p and packet timestamp t (e.g., a time when the packet was created using UTC—Universal Time Coordinated clock to maintain the time synchronization between different time zones). The ICN router queries these QoS information objects and computes the TTL using current time (e.g., current in milliseconds calculated using UTC clock) at the ICN router to assess the validity of the packet.

If the packet passes the QoS validation, then upstream or downstream forwarding decisions are made to select outbound (e.g., upstream or downstream) interface. Broadcasting the QoS packet in the absence of routing information enables packet propagation to reach endpoints, be they content providers in the case of interest packets or content consumers in the case of data packets. Further, time-based packet suppression reduces network congestion of invalid packets while enabling deadline aware data delivery.

Figure 4A:
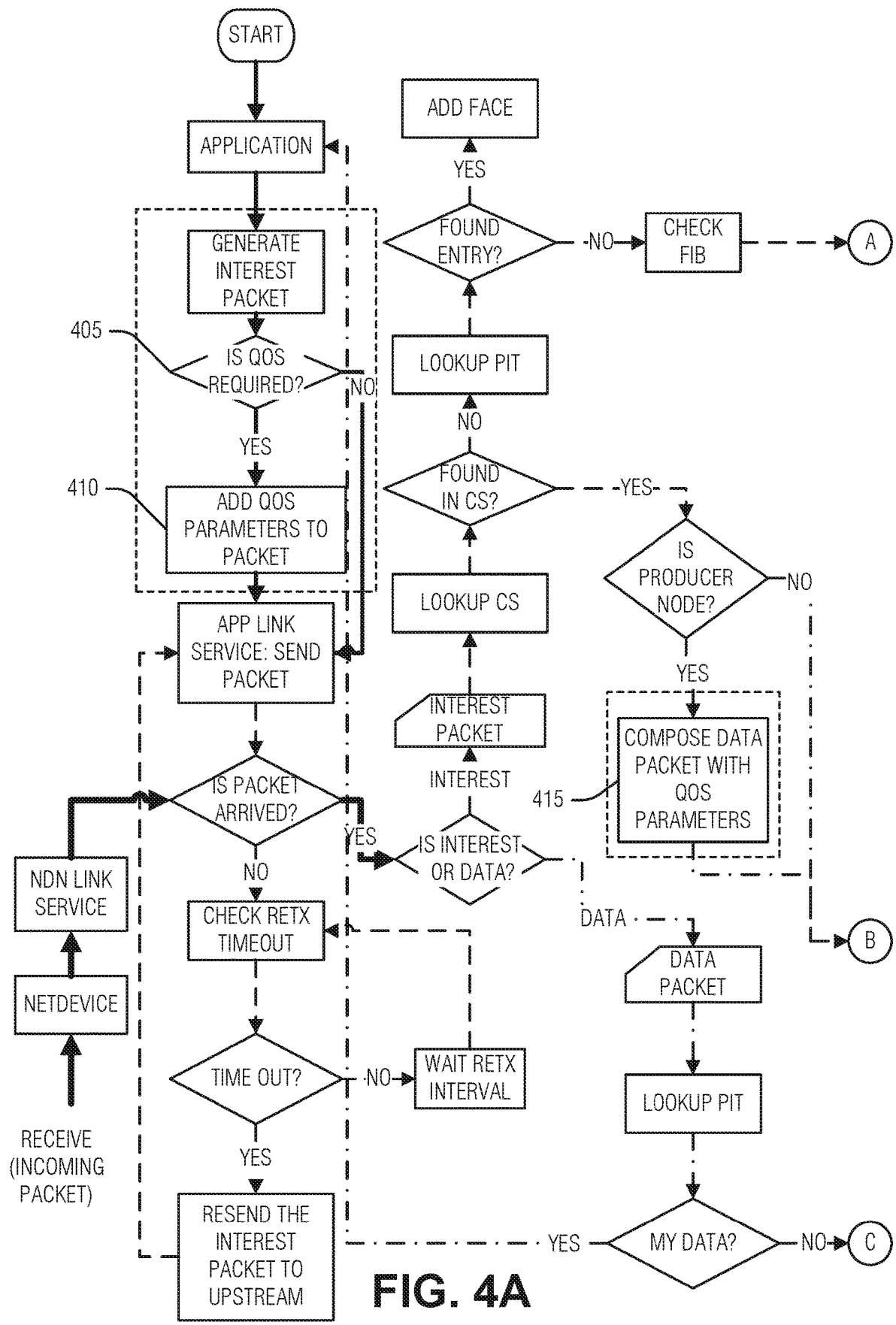
FIGS. 4A-4B illustrate an example of an NDN packet processing flow integrated with QoS aware multi-hop forwarding extensions, according to an embodiment.
Figure 4B:
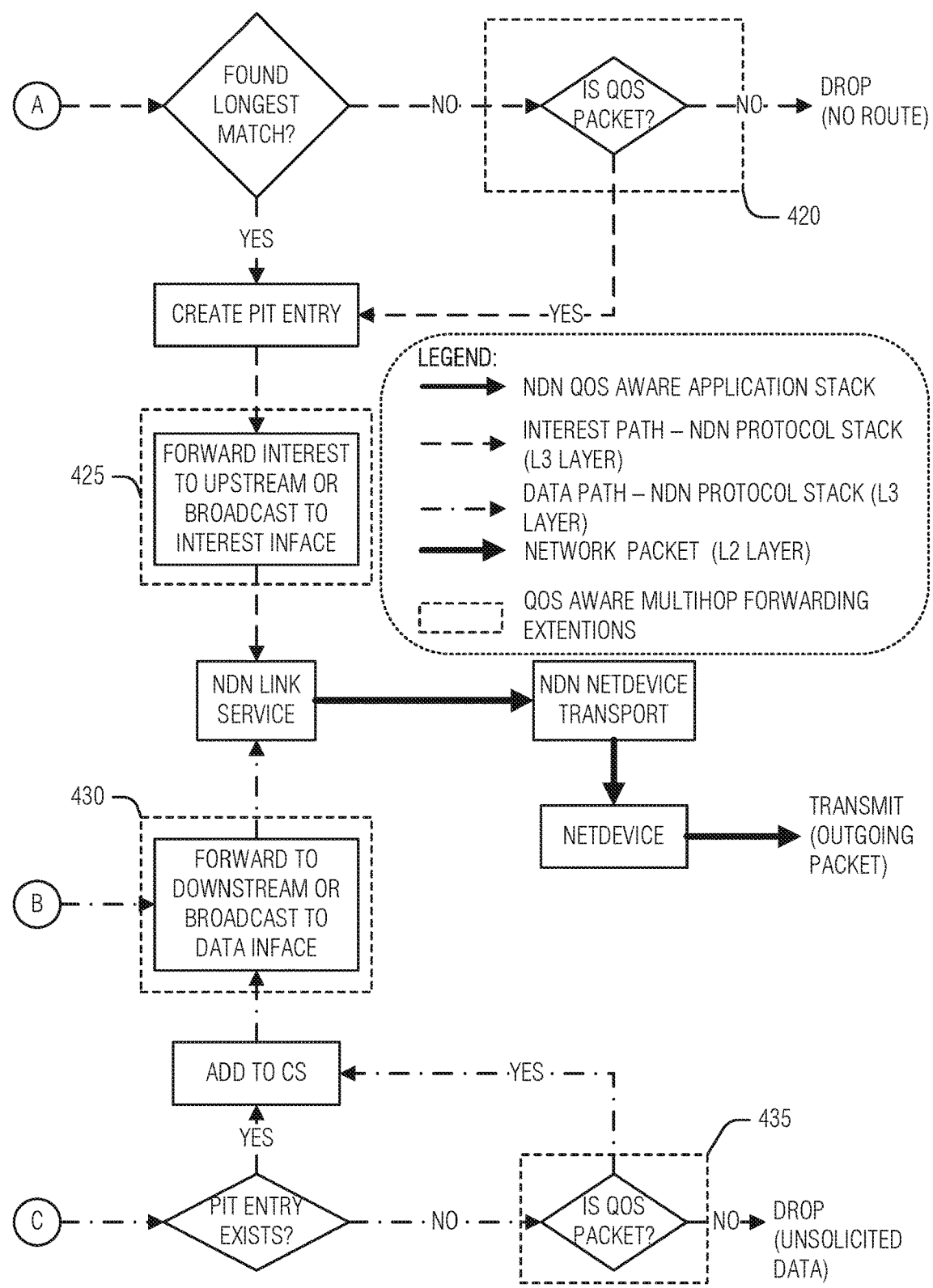

Due to unpredictable topology in wireless mobile networks, the prospect of a direct route between the consumer (e.g., content requester) node and the producer (e.g., data source) nodes may be very low. This uncertainty is caused by varying distances between the nodes, connectivity range limitations and the heavy interference caused by the dynamics of mobile nodes. To overcome the above-mentioned issues, packets may be intercepted at each ICN router, where the TLV encoded QoS information embedded in the packet header is extracted. If the packet meets the QoS constraints (e.g., 100-300 ms duration of round-trip-time based on tolerated latency per information type) a network link may be opportunistically created by dynamically creating a route to the producer node. FIGS. 4A and 4B illustrate a detailed process flow of QoS-aware multi-hop packet forwarding in NDN according to this technique.

The traditional NDN process flow illustrated in FIG. 4 is modified by the operations in the short-dashed boxes. Thus, on FIG. 4A, the application makes a decision whether or not to add the QoS information (decision 405). If yes, then the QoS information is encoded and added to the interest packet (operation 410). Similarly, if the routing node that receives the interest packet is a producer of the content named in the interest packet, the routing node responds with a data packet that includes the QoS information encoded into the data packet (operation 415).

In FIG. 4B, if the ICN router does not have the named content, it attempts to find a FIB entry for a forwarding (e.g., upstream) interface. If this fails, because the QoS information is present (decision 420), the ICN router sends the interest packet on an upstream interface anyway (operation 425). An analogous sequence occurs with a received data packet with QoS information. Thus, if QoS information is present in a data packet (decision 435) even though there is no corresponding PIT entry, the ICN router caches the content and forwards the data packet on a downstream interface (operation 430).

Many ICN variants (e.g., NDN) focus on the forwarding plane (e.g., network forwarding device (NFD) Layer 3 protocols) to achieve name-based content delivery. The discussion above (e.g., FIGS. 1-4B) address deadline-aware data delivery in the NFD to support priority-based packet delivery to achieve QoS in deadline aware content delivery scenarios. However, this differentiated (e.g. priority aware or QoS based) packet processing is also important at Layer 2 of the networking stack to improve traffic control on the network. Emerging applications, such as autonomous vehicles, augmented reality, industrial robotics, may contain control loops that are highly sensitive to delay and reliable, sequential data delivery. Without a congestion control mechanism at Layer 2, it is difficult to enforce QoS policies and the management of network bandwidth or congestion. This may result in the random dropping of time-critical or priority packets. These behaviors would generally lead to poor QoS performance.

To address these issues, an extension to current ICN designs is made that includes traffic control. The viability of delivering time-sensitive information in dynamic environments—e.g., vehicular networks—in manner that is both reliable, locally consistent, and deadline aware is challenging due to the following reasons:

Dynamic nature of vehicular environment leads to unpredictable network topology or pattern.

Short link durations (e.g., averaging less than 6 secs in 97% of cases).

Uncertain communication scenarios such as disconnections, disruptions or network black spots.

An ICN stateful forwarding plane (e.g., Layer 3) enables routers to control congestion at each hop by either dropping interest packets or diverting them to alternative paths. However, once a packet leaves Layer 3, there is no traditional ICN mechanism to process the packet differently within queues at Layer 2 that consider QoS or deadline awareness. Traditional thoughts on congestion control and traffic management in NDN have generally focused on altering or reshaping the request rate (e.g., interest packet rate) at the application level by measuring the TCP RTO (retransmission time-outs) and the RTT (round-trip-time) of successfully returned packets. Network overload characteristic have been considered by controlling both in-network cache as well as interest forwarding rate in order to manage the congestion. On the other hand, in the state-of-the art IP networking, the application requirements are condensed into each packet via a six-bit field used to specify Differentiated Services in the IP header. The purpose of this information is to enable the network to classify and manage network traffic and provide desired quality of service as discussed above.

The previous solutions are mainly centered in the forwarding plane (e.g., Layer 3), and also depend on the performance metrics like round-trip-time (RTT), Recovery Time Object (RTO), etc. from the applications in order to re-adjust the request rate. These approaches generally do not pay any consideration to QoS or deadline aware delivery requirement aspect of the packets. In addition, once the packets enter Layer 2, the application specific QoS information is no longer exposed and it is not a trivial matter to access in order to provide differentiated processing at the Layer 2 transmission queues.

To address these issues. ICN routers are enhanced to control network traffic and manage the congestion in order to achieve the QoS and deadline aware data delivery by utilizing the bandwidth optimally. In an example, the technique is implemented in a system or device embedded into a network stack and that enables configuration of specific application traffic optimization for the network.

Figure 5:
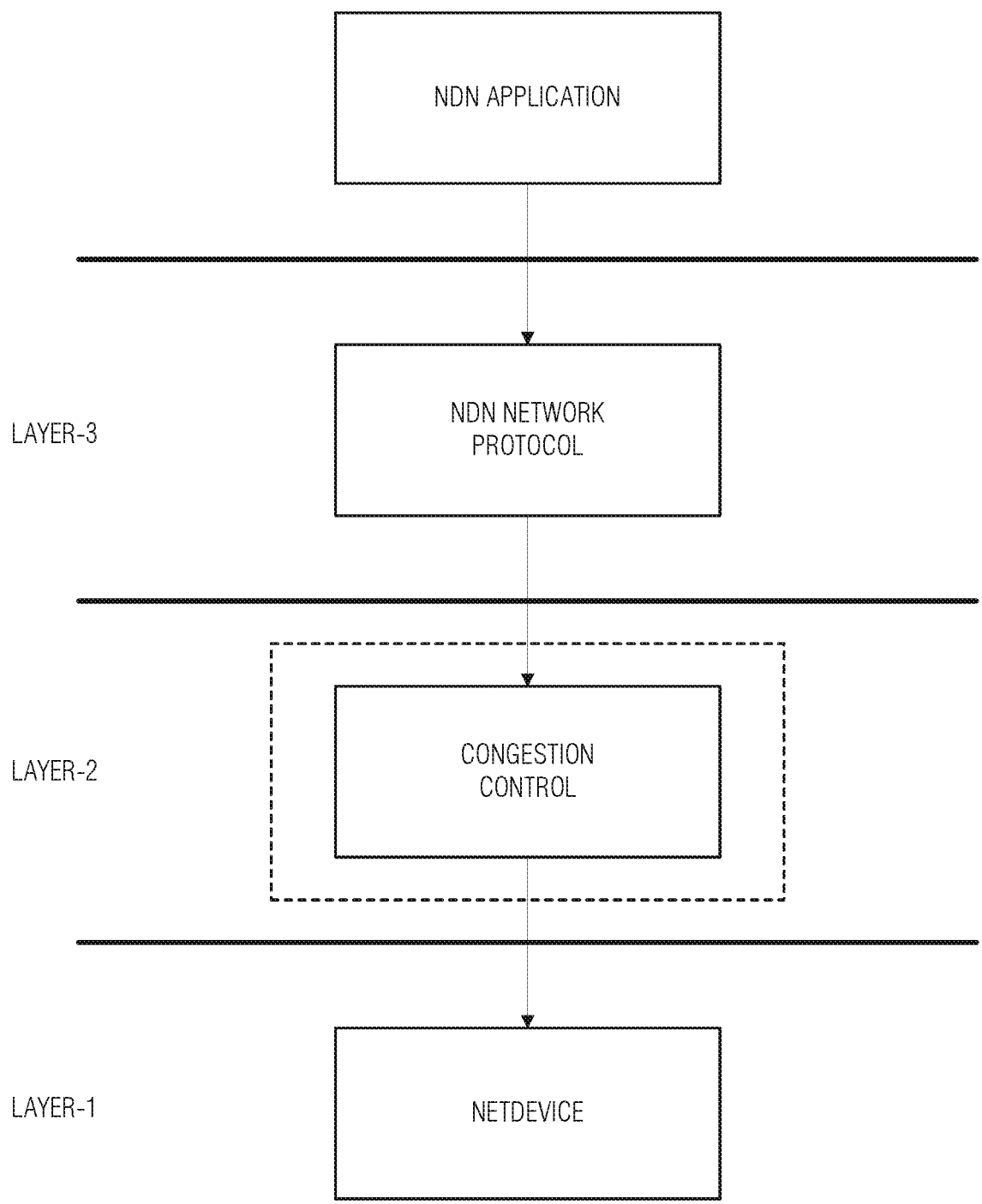
FIG. 5 illustrates an example of an NDN flow with congestion control extension, according to an embodiment.

FIG. 5 shows the high-level overview of a system that includes the insertion of congestion control mechanism at Layer 2 to intercept the packets leaving an ICN forwarding stack to re-order the packets in transmission queues to implement prioritized transmission of packets that has QoS deadline. The congestion control system retrieves the QoS information from the packet tag of a network packet. The QoS information in the packet is copied into the packet tag at Layer 3. The packet may be converted into a standard network packet for transmission before leaving Layer 3 on its way to Layer 2.

Figure 6:
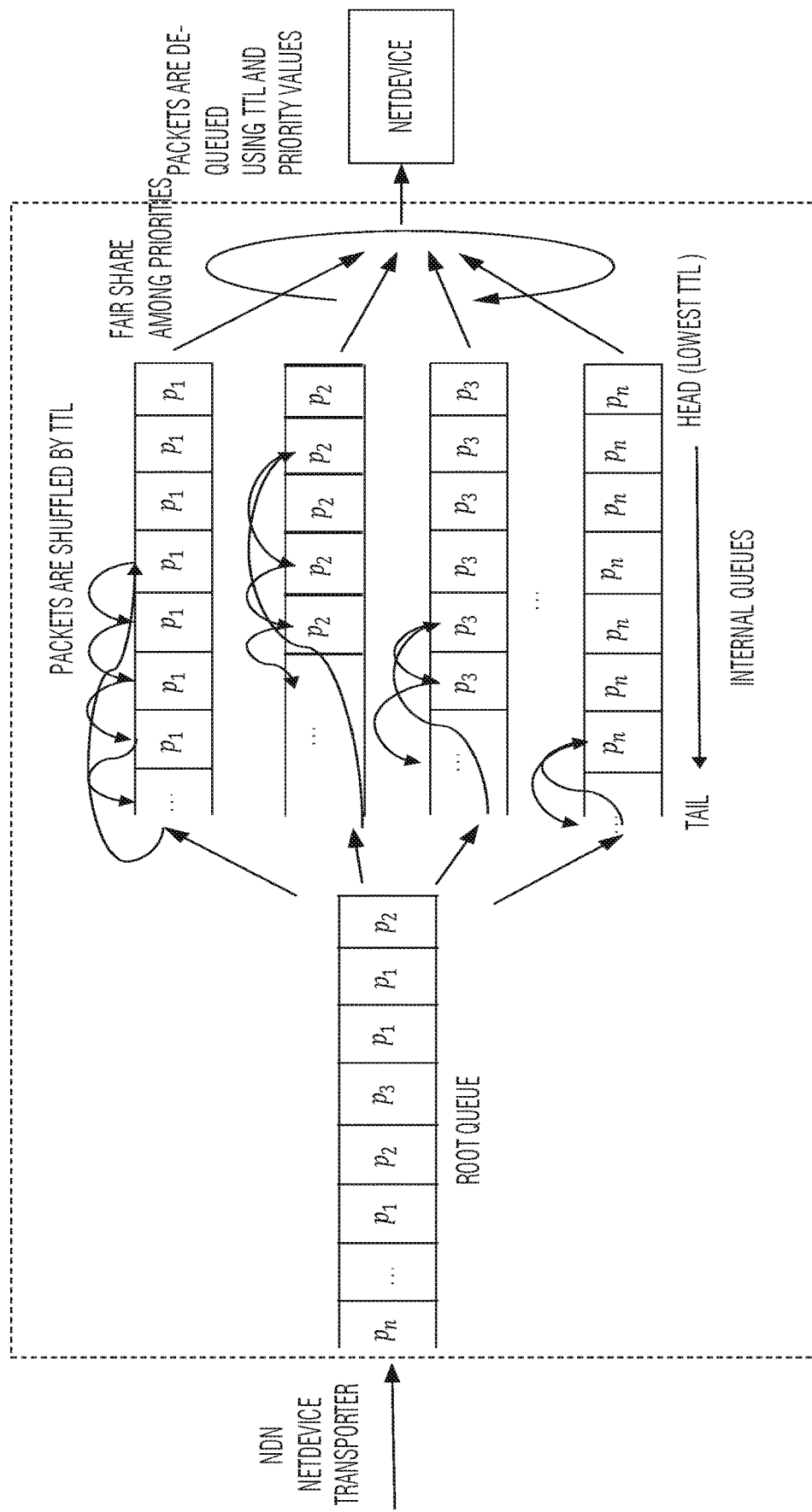
FIG. 6 illustrates an example of a congestion control system, according to an embodiment.

FIG. 6 illustrates a priority aware Layer 2 queuing technique. In an example, the QoS information comprises packet priority classification (e.g., p1, p3, p3, ..., pn (smaller the subscript value higher the priority)), timestamp t0—the time value when the packet was first sent by a consumer, and the RTTL. Packets arriving from the Layer 3 stack are queued in the same order of their arrival in the illustrated root queue. After this, the packet may be placed in internal queues created for each priority class as shown in FIG. 6. The placement order of the packets in the internal queues are shuffled such that the smallest time-to-live packets remain at the head of the internal queues.

The time-to-live values may be calculated using the following:

$$t_{ttl} = t_{rtt} - \text{elapsed time}$$

$$\text{elapsed time} = t_{current} - t_0$$

Where tcurrent is the present time at the queue and the elapsed time is a duration since the packet was created at the Layer 3 ICN application level. If the elasped time time is greater than the round-trip-time $t_{rtt}$, then the packet is dropped. In an example, the length of the queue may be limited via a configuration parameter, such as a maximum of 1000 packets per queue. In an example, a packet is dropped when the number of packets in a queue exceeds the maximum limit to control the congestion as defined by the configuration parameter.

To choose the packets for transmission from the internal queues, the TTL values of packets that present at the head of the queues are read first. Then, comparisons are made among the queue heads to select the packet has the smallest TTL value. If more than one packet has the same TTL that is also the smallest TTL among the queue heads, then the packet with the highest priority is chosen. As packets age in the queues, some may exceed their RTTL and be dropped before transmission. Dropping these packets from the queue (e.g., low priority packets) when the maximum limit has been exceeded further reduces congestion in the network.

Figure 7A:
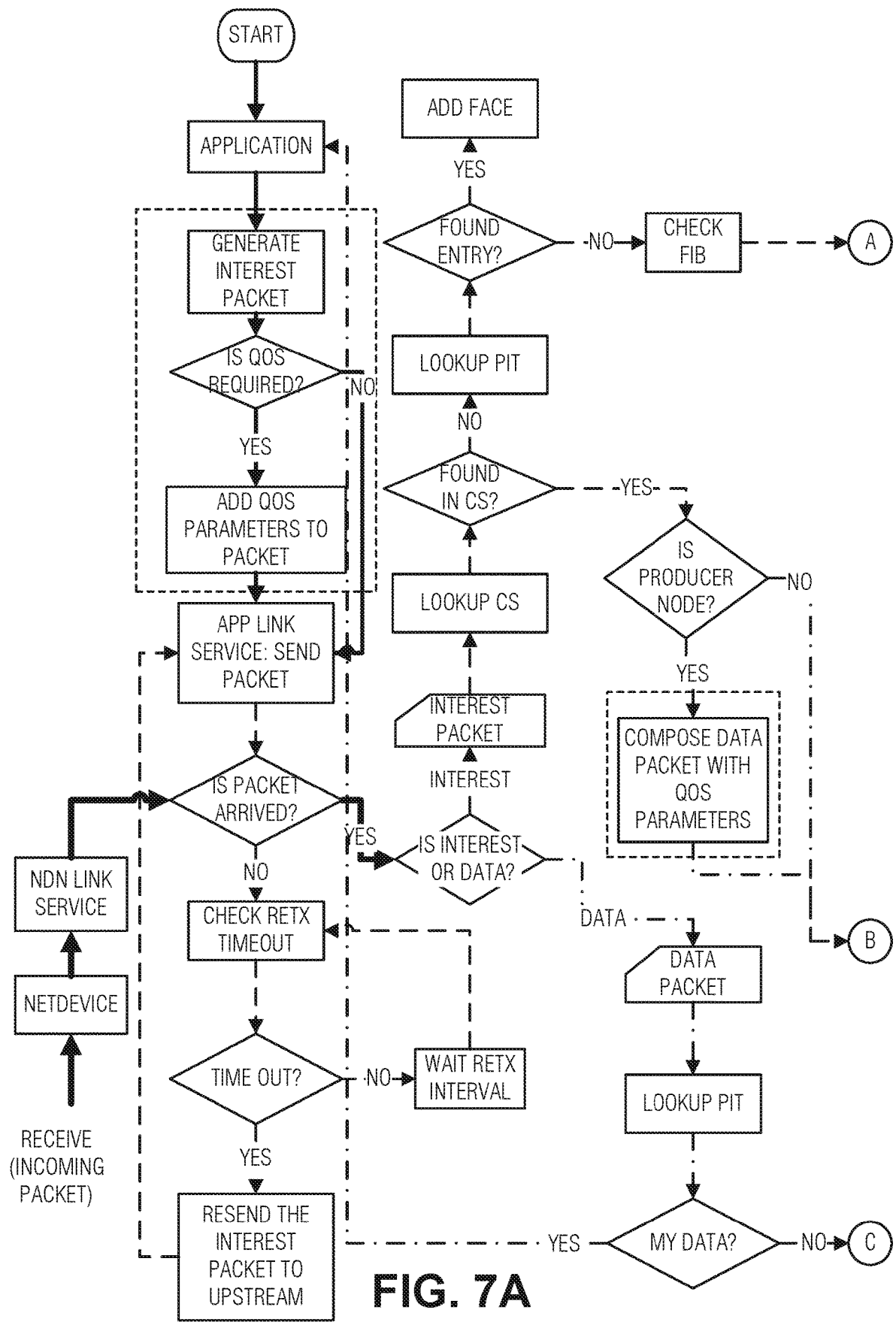
FIGS. 7A-7B illustrate an example of an NDN packet processing flow with integrated congestion control according to an embodiment.
Figure 7B:
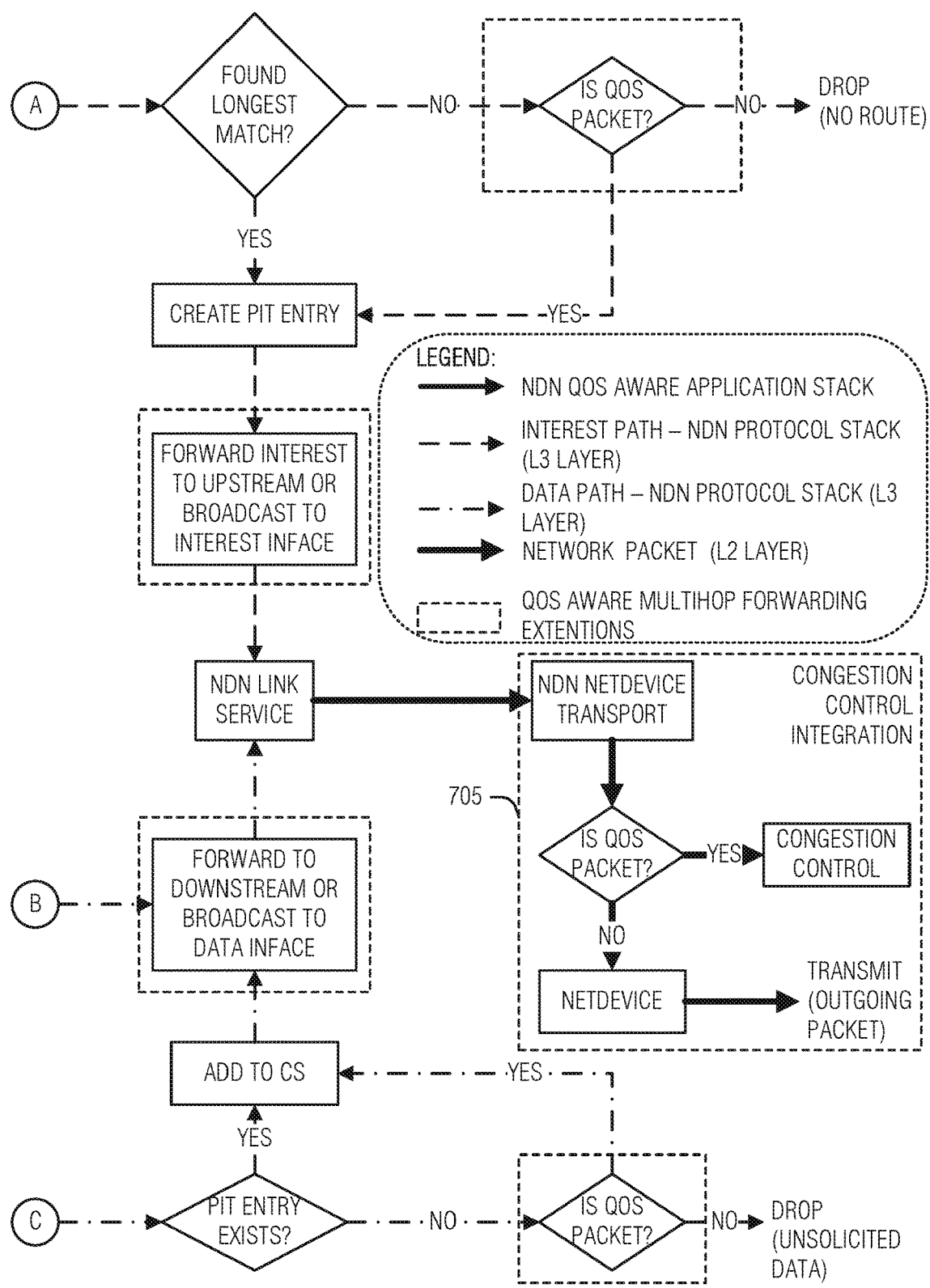

FIGS. 7A and 7B following the same ICN processing flow described above with respect to FIGS. 4A and 4B with the addition of the QoS elements 705. The QoS elements 705 are used to implement the Layer 2 QoS activities signaled from the Layer 3 QoS information in either interest or data packets. For example, the congestion control block in the QoS elements 705 may implement the queue-based packet selection for congestion control discussed above with respect to FIG. 6.

Figure 8:
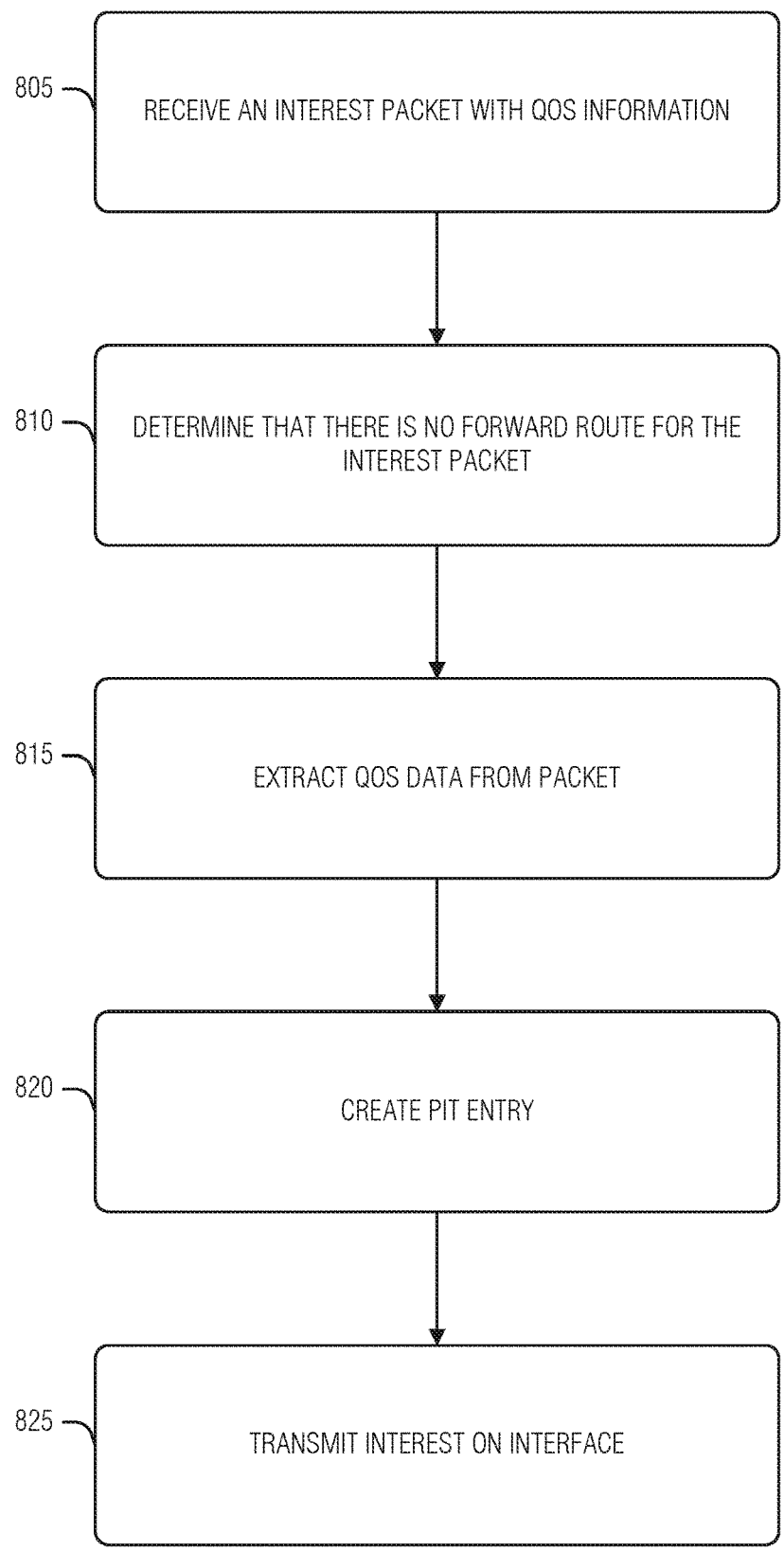
FIG. 8 illustrates a flowchart of a method for ICN packet control, according to an embodiment.

FIG. 8 illustrates a flowchart of a method 800 for ICN packet control, according to an embodiment. The operations of the method 800 are performed by computer hardware, such as processing circuitry in a router, an ICN router, switch, node, or another device.

At operation 805, an interest packet is received at an ICN forwarding node. Such forwarding nodes include at least two interfaces and ae configured to forward an interest or data packet between the interfaces to reach destination nodes. In an example, the forwarding node is an ICN router.

The interest packet received at operation 805 includes quality of service (QoS) information. In an example, the QoS information is a portion of a header of the interest packet. In an example, the QoS information includes multiple fields encoded with a type-length-value (TLV) encoding. This type of encoding has a set symbol (e.g., one or more fixed length of bits) representing the field type (e.g., integer, string, etc.), followed by a fixed length field, and then a variable number of bits representing the field value.

At operation 810, a determination is made that the forwarding node does not have a forward route for the interest packet in the FIB. Under traditional ICN systems, this lack of forward route means that there is no route and the interest packet would be dropped. However, in the method 800, with use of QoS information, when the determination that there is no forward route, the method 800 uses the QoS information to queue the packet for a limited time.

At operation 815, the QoS information is extracted from the interest packet.

At operation 820, an entry is created for the interest packet in the PIT. Creating this entry is different than traditional ICN operations that would have dropped the packet due to a lack of route in the FIB.

At operation 825, the interest packet is transmitted on upstream interface of the forwarding node in accordance with the QoS information. Here, upstream interface refers to an interface (e.g., ethernet port, fiber optic terminal, etc.) of the forwarding node that is different than the interface upon which the interest packet was received. In some network topologies, upstream interfaces may be reserved for content provider facing links as opposed to downstream interfaces that may be defined for content consumer links. In an example, transmitting the interest packet on the upstream interface includes broadcasting the interest packet across all of the upstream interfaces. Such a broadcast is designed to reach a large number of possibly responsive content providers to decrease latency a data packet response to the interest packet.

In an example, where the QoS information has multiple fields, the fields include at least two of priority, timestamp, round-trip-time (RTT), or time to live (TTL). In an example, broadcasting the interest packet in accordance with the QoS information includes placing multiple interest packets in a queue for transmission on upstream interfaces. These interest packets may be sorted in the queue based on priority. In an example, interest packets of a same priority may be sorted in the queue based on TTL. Here, when it comes to selecting a next packet to transmit, the interest packet is selected for broadcast when the interest packet is at a head of the queue. Thus, TTL primary sorting reduces packet starvation by ensuring that shorter lied packets are selected first. However, within a population of packets with the same TTL, those with the higher priority are selected.

In an example, priority organization is performed via distinct internal queues, each queue containing packets of a single priority class. Within these queues, the packets are sorted by TTL. Thus, those packets that will expire earliest are at the head of the queues. To select the next packet for transmission, each queue head is checked to determine which has the smallest TTL. If there are two packets with the smallest TTL, then the one from the higher priority queue is selected.

In an example, the operations of the method 800 are extended to cover handling unsolicited data packets with QoS information. Here, an unsolicited data packet is a received data packet that has no corresponding PIT entry. In traditional ICN techniques, such a data packet would be discarded. Here, however, when the QoS information is present, the data packet is not discarded. Rather, a FIB entry is made, and the data packet is forwarded onto downstream interfaces. Thus, in an example, a data packet may be received at the forwarding node. Again, here, the data packet includes QoS information. The forwarding node determines that the ICN router does not have a PIT entry for the data packet. The forwarding node then extracts the QoS information from the interest packet. Due to the existence of the QoS information, the forwarding node broadcasts the data packet on one or more downstream interfaces.

Figure 9:
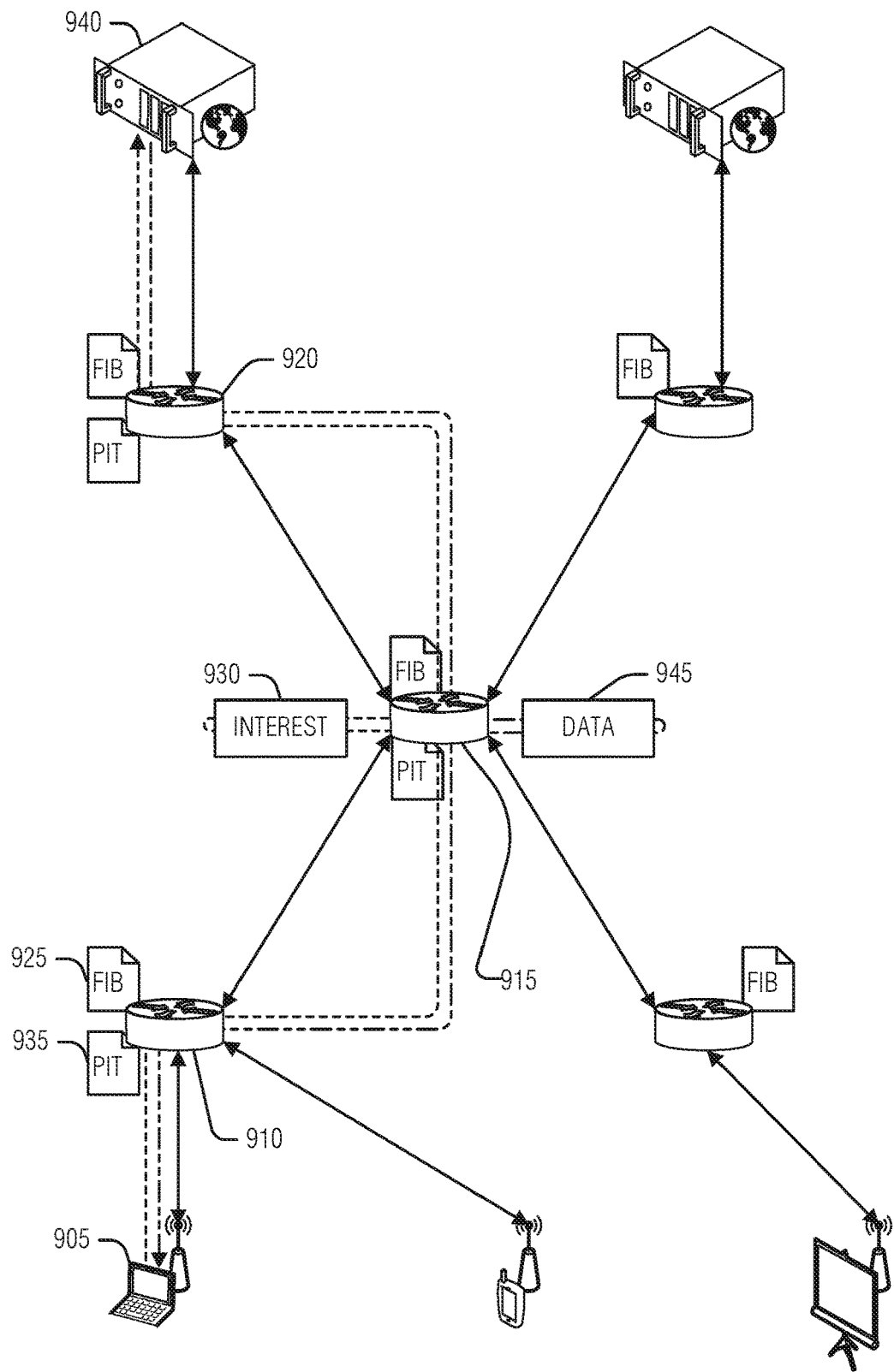
FIG. 9 illustrates an example ICN, according to an embodiment.
Figure 10:
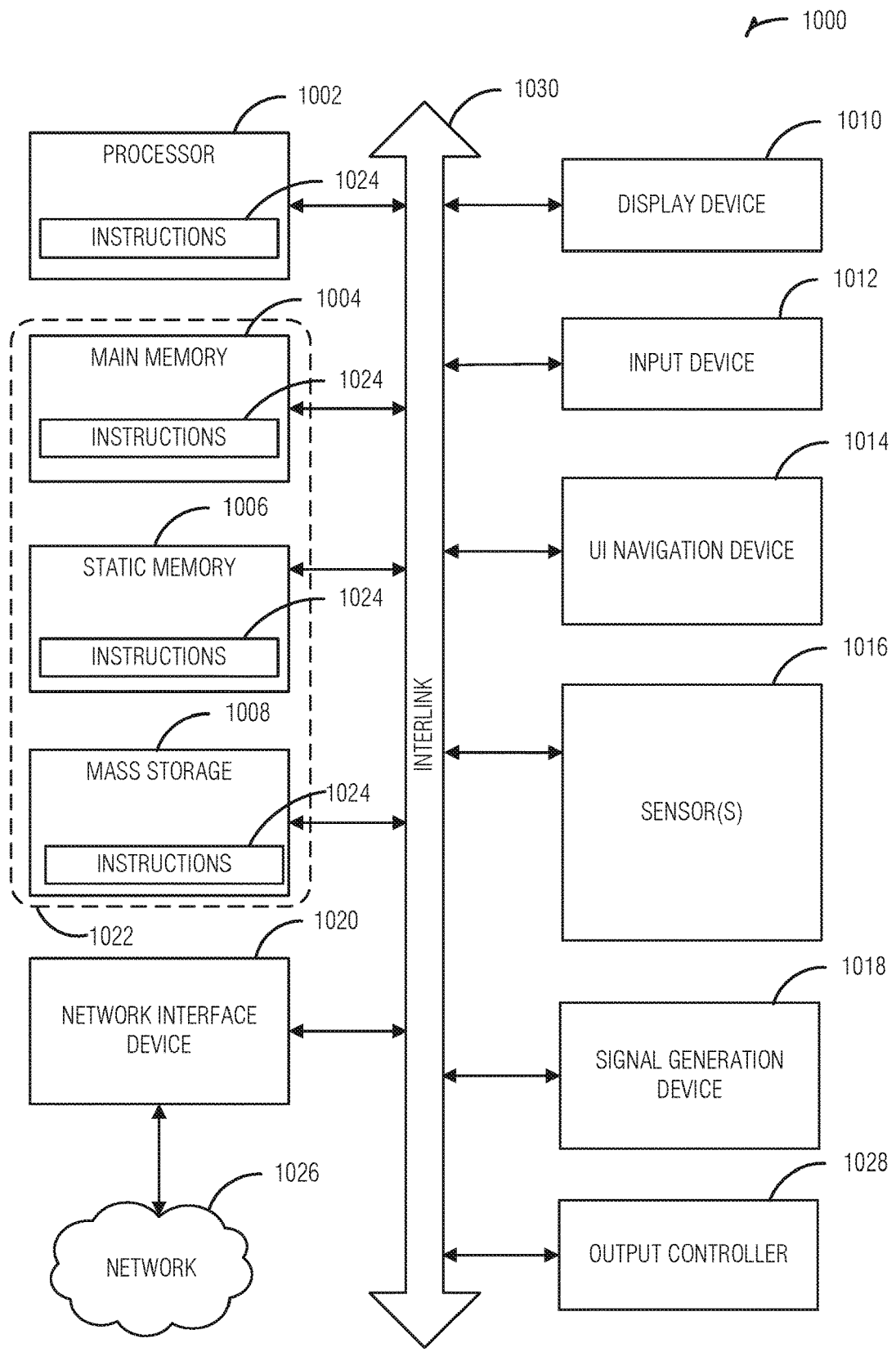
FIG. 10 is a block diagram illustrating an example of a machine upon which one or more embodiments may be implemented.

FIGS. 9 and 10 below provide additional details of some of the components described above. For example, FIG. 9 illustrates several details and variations in ICNs. FIG. 10 illustrates several examples of computer hardware that may be used to implement any of the components illustrated in FIG. 1.

FIG. 9 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 905 (e.g., subscriber) requests named content from the network itself. The content request may be called an interest and transmitted via an interest packet 930. As the interest packet traverses network devices (e.g., network elements, routers, switches, hubs, etc.)—such as network elements 910, 915, and 920-*a* record of the interest is kept, for example, in a pending interest table (PIT) at each network element. Thus, network element 910 maintains an entry in its PIT 935 for the interest packet 930, network element 915 maintains the entry in its PIT, and network element 920 maintains the entry in its PIT.

When a device, such as publisher 940, that has content matching the name in the interest packet 930 is encountered, that device 940 may send a data packet 945 in response to the interest packet 930. Typically, the data packet 945 is tracked back through the network to the source (e.g., device 905) by following the traces of the interest packet 930 left in the PITs of the respective network elements. Thus, the PIT 935 at each network element establishes a trail back to the subscriber 905 for the data packet 945 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category. "videos," and the canonical identification "v8675309." As an interest 930 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 930 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 930 to data cached in the ICN element. Thus, for example, if the data 945 named in the interest 930 is cached in network element 915, then the network element 915 will return the data 945 to the subscriber 905 via the network element 910. However, if the data 945 is not cached at network element 915, the network element 915 routes the interest 930 on (e.g., to network element 920). To facilitate routing, the network elements may use a forwarding information base 925 (FIB) to match named data to an interface (e.g., physical port) for the route. Thus, the FIB 925 operates much like a routing table on a traditional network device.

In an example, additional meta-data may be attached to the interest packet 930, the cached data, or the route (e.g., in the FIB 925), to provide an additional level of matching. For example, the data name may be specified as "www.somedomain.com or videos or v8675309," but also include a version number—or timestamp, time range, endorsement, etc. In this example, the interest packet 930 may specify the desired name, the version number, or the version range. The matching may then locate routes or cached data matching the name and perform the additional comparison of meta-data or the like to arrive at an ultimate decision as to whether data or a route matches the interest packet 930 for respectively responding to the interest packet 930 with the data packet 945 or forwarding the interest packet 930.

ICN has advantages over host-based networking because the data segments are individually named. This enables aggressive caching throughout the network as a network element may provide a data packet 930 in response to an interest 930 as easily as an original author 940. Accordingly, it is less likely that the same segment of the network will transmit duplicates of the same data requested by different devices.

Fine grained encryption is another feature of many ICN networks. A typical data packet 945 includes a name for the data that matches the name in the interest packet 930. Further, the data packet 945 includes the requested data and may include additional information to filter similarly named data (e.g., by creation time, expiration time, version, etc.). To address malicious entities providing false information under the same name, the data packet 945 may also encrypt its contents with a publisher key or provide a cryptographic hash of the data and the name. Thus, knowing the key (e.g., from a certificate of an expected publisher 940) enables the recipient to ascertain whether the data is from that publisher 940. This technique also facilitates the aggressive caching of the data packets 945 throughout the network because each data packet 945 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

FIG. 10 illustrates a block diagram of an example machine 1000 upon which any one or more of the techniques (e.g., methodologies) discussed herein may perform. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 may be representative of the instructions 1024, such as instructions 1024 themselves or a format from which the instructions 1024 may be derived. This format from which the instructions 1024 may be derived may include source code, encoded instructions (e.g., in compressed or encrypted form), packaged instructions (e.g., split into multiple packages), or the like. The information representative of the instructions 1024 in the machine readable medium 1022 may be processed by processing circuitry into the instructions to implement any of the operations discussed herein. For example, deriving the instructions 1024 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 may include assembly, compilation, or interpretation of the information (e.g., by the processing circuitry) to create the instructions 1024 from some intermediate or preprocessed format provided by the machine readable medium 1022. The information, when provided in multiple parts, may be combined, unpacked, and modified to create the instructions 1024. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

ADDITIONAL NOTES & EXAMPLES

Example 1 is an Information Centric Network (ICN) router for ICN packet transmission control, the ICN router comprising: a memory including instructions; and processing circuitry that, when in operation, is configured by the instructions to: receive an interest packet that includes, quality of service (QoS) information; create an entry for the interest packet in a pending interest table (PIT) of the ICN router; determine that the ICN router does not have a forward route for the interest packet in a forwarding information base (FIB) of the ICN router; extract the QoS information from the interest packet; and broadcast the interest packet on upstream interfaces of the ICN router in accordance with the QoS information.

In Example 2, the subject matter of Example 1 includes, wherein the QoS information includes a priority value, and wherein, to broadcast the interest packet on the upstream interfaces in accordance with the QoS information, the instructions configure the processing circuitry to broadcast the interest packet when the priority value is above a threshold.

In Example 3, the subject matter of Examples 1-2 includes, wherein the QoS information is a portion of a header of the interest packet.

In Example 4, the subject matter of Example 3 includes, wherein the QoS information includes multiple fields encoded with a type-length-value (TLV) encoding.

In Example 5, the subject matter of Example 4 includes, wherein the multiple fields include at least two of priority, timestamp, round-trip-time (RTT), or time to live (TTL).

In Example 6, the subject matter of Example 5 includes, wherein, to broadcast the interest packet in accordance with the QoS information, the instructions configure the processing circuitry to: place multiple interest packets in a queue for transmission on upstream interfaces; sort the multiple interest packets in the queue based on priority; sort among interest packets of a same priority in the queue based on TTL; and select the interest packet for broadcast when the interest packet is at a head of the queue.

In Example 7, the subject matter of Example 6 includes, wherein an internal queue is maintained for each priority in the queue.

In Example 8, the subject matter of Example 7 includes, wherein the head of the queue is selected among heads of the internal queues.

In Example 9, the subject matter of Example 8 includes, wherein a round-robin technique is used to select among the heads of the internal queues.

In Example 10, the subject matter of Examples 1-9 includes, wherein the instructions configure the processing circuitry to: receive a data packet that includes quality of service (QoS) information; determine that the ICN router does not have a PIT entry for the data packet; extract the QoS information from the interest packet; and broadcast the data packet on downstream interfaces of the ICN router in accordance with the QoS information.

Example 11 is a method for Information Centric Network (ICN) packet transmission control, the method comprising: receiving, at an ICN router, an interest packet that includes, quality of service (QoS) information; creating an entry for the interest packet in a pending interest table (PIT) of the ICN router; determining that the ICN router does not have a forward route for the interest packet in a forwarding information base (FIB) of the ICN router; extracting the QoS information from the interest packet; and broadcasting the interest packet on upstream interfaces of the ICN router in accordance with the QoS information.

In Example 12, the subject matter of Example 11 includes, wherein the QoS information includes a priority value, and wherein broadcasting the interest packet on the upstream interfaces in accordance with the QoS information includes broadcasting the interest packet when the priority value is above a threshold.

In Example 13, the subject matter of Examples 11-12 includes, wherein the QoS information is a portion of a header of the interest packet.

In Example 14, the subject matter of Example 13 includes, wherein the QoS information includes multiple fields encoded with a type-length-value (TLV) encoding.

In Example 15, the subject matter of Example 14 includes, wherein the multiple fields include at least two of priority, timestamp, round-trip-time (RTT), or time to live (TTL).

In Example 16, the subject matter of Example 15 includes, wherein broadcasting the interest packet in accordance with the QoS information includes: placing multiple interest packets in a queue for transmission on upstream interfaces; sorting the multiple interest packets in the queue based on priority; sorting among interest packets of a same priority in the queue based on TTL; and selecting the interest packet for broadcast when the interest packet is at a head of the queue.

In Example 17, the subject matter of Example 16 includes, wherein an internal queue is maintained for each priority in the queue.

In Example 18, the subject matter of Example 17 includes, wherein the head of the queue is selected among heads of the internal queues.

In Example 19, the subject matter of Example 18 includes, wherein a round-robin technique is used to select among the heads of the internal queues.

In Example 20, the subject matter of Examples 11-19 includes, receiving, at the ICN router, a data packet that includes quality of service (QoS) information; determining that the ICN router does not have a PIT entry for the data packet; extracting the QoS information from the interest packet; and broadcasting the data packet on downstream interfaces of the ICN router in accordance with the QoS information.

Example 21 is at least one non-transitory machine-readable medium including instructions for Information Centric Network (ICN) packet transmission control, the instructions, when executed by processing circuitry, cause an ICN router to perform operations comprising: receiving an interest packet that includes, quality of service (QoS) information; creating an entry for the interest packet in a pending interest table (PIT) of the ICN router; determining that the ICN router does not have a forward route for the interest packet in a forwarding information base (FIB) of the ICN router; extracting the QoS information from the interest packet; and broadcasting the interest packet on upstream interfaces of the ICN router in accordance with the QoS information.

In Example 22, the subject matter of Example 21 includes, wherein the QoS information includes a priority value, and wherein broadcasting the interest packet on the upstream interfaces in accordance with the QoS information includes broadcasting the interest packet when the priority value is above a threshold.

In Example 23, the subject matter of Examples 21-22 includes, wherein the QoS information is a portion of a header of the interest packet.

In Example 24, the subject matter of Example 23 includes, wherein the QoS information includes multiple fields encoded with a type-length-value (TLV) encoding.

In Example 25, the subject matter of Example 24 includes, wherein the multiple fields include at least two of priority, timestamp, round-trip-time (RTT), or time to live (TTL).

In Example 26, the subject matter of Example 25 includes, wherein broadcasting the interest packet in accordance with the QoS information includes: placing multiple interest packets in a queue for transmission on upstream interfaces; sorting the multiple interest packets in the queue based on priority; sorting among interest packets of a same priority in the queue based on TTL; and selecting the interest packet for broadcast when the interest packet is at a head of the queue.

In Example 27, the subject matter of Example 26 includes, wherein an internal queue is maintained for each priority in the queue.

In Example 28, the subject matter of Example 27 includes, wherein the head of the queue is selected among heads of the internal queues.

In Example 29, the subject matter of Example 28 includes, wherein a round-robin technique is used to select among the heads of the internal queues.

In Example 30, the subject matter of Examples 21-29 includes, wherein the operations comprise: receiving a data packet that includes quality of service (QoS) information; determining that the ICN router does not have a PIT entry for the data packet; extracting the QoS information from the interest packet; and broadcasting the data packet on downstream interfaces of the ICN router in accordance with the QoS information.

Example 31 is a system for Information Centric Network (ICN) packet transmission control, the system comprising: means for receiving, at an ICN router, an interest packet that includes, quality of service (QoS) information; means for creating an entry for the interest packet in a pending interest table (PIT) of the ICN router; means for determining that the ICN router does not have a forward route for the interest packet in a forwarding information base (FIB) of the ICN router; means for extracting the QoS information from the interest packet; and means for broadcasting the interest packet on upstream interfaces of the ICN router in accordance with the QoS information.

In Example 32, the subject matter of Example 31 includes, wherein the QoS information includes a priority value, and wherein the means for broadcasting the interest packet on the upstream interfaces in accordance with the QoS information include means for broadcasting the interest packet when the priority value is above a threshold.

In Example 33, the subject matter of Examples 31-32 includes, wherein the QoS information is a portion of a header of the interest packet.

In Example 34, the subject matter of Example 33 includes, wherein the QoS information includes multiple fields encoded with a type-length-value (TLV) encoding.

In Example 35, the subject matter of Example 34 includes, wherein the multiple fields include at least two of priority, timestamp, round-trip-time (RTT), or time to live (TTL).

In Example 36, the subject matter of Example 35 includes, wherein the means for broadcasting the interest packet in accordance with the QoS information include: means for placing multiple interest packets in a queue for transmission on upstream interfaces; means for sorting the multiple interest packets in the queue based on priority; means for sorting among interest packets of a same priority in the queue based on TTL; and means for selecting the interest packet for broadcast when the interest packet is at a head of the queue.

In Example 37, the subject matter of Example 36 includes, wherein an internal queue is maintained for each priority in the queue.

In Example 38, the subject matter of Example 37 includes, wherein the head of the queue is selected among heads of the internal queues.

In Example 39, the subject matter of Example 38 includes, wherein a round-robin technique is used to select among the heads of the internal queues.

In Example 40, the subject matter of Examples 31-39 includes, means for receiving, at the ICN router, a data packet that includes quality of service (QoS) information; means for determining that the ICN router does not have a PIT entry for the data packet; means for extracting the QoS information from the interest packet; and means for broadcasting the data packet on downstream interfaces of the ICN router in accordance with the QoS information.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An Information Centric Network (ICN) router for ICN packet transmission control, the ICN router comprising:
   a memory including instructions; and
   processing circuitry that, when in operation, is configured by the instructions to:
   receive an interest packet that includes quality of service (QoS) information;
   create an entry for the interest packet in a pending interest table (PIT) of the ICN router;
   determine that the ICN router does not have a forward route for the interest packet in a forwarding information base (FIB) of the ICN router;
   extract the QoS information from the interest packet; and
   broadcast the interest packet on upstream interfaces of the ICN router in accordance with the QoS information, including the processing circuitry to:
   place multiple interest packets in a queue for transmission on the upstream interfaces;
   sort the multiple interest packets in the queue based on a priority value from the QoS information; and
   select the interest packet for broadcast when the interest packet is at a head of the queue.

2. The ICN router of claim 1, wherein the QoS information is a portion of a header of the interest packet.

3. The ICN router of claim 2, wherein the QoS information includes multiple fields encoded with a type-length-value (TLV) encoding.

4. The ICN router of claim 3, wherein the multiple fields include at least two of: the priority value, a timestamp value, a round-trip-time (RTT) value, or time to live (TTL) value.

5. The ICN router of claim 4, wherein, to
   sort the multiple interest packets in the queue based on the priority value, the processing circuitry sorts among interest packets of a same priority in the queue based on TTL.

6. The ICN router of claim 1, wherein an internal queue is maintained for each priority in the queue.

7. The ICN router of claim 6, wherein the head of the queue is selected among heads of the internal queues.

8. The ICN router of claim 1, wherein the instructions configure the processing circuitry to:
   receive a data packet that includes quality of service (QoS) information;
   determine that the ICN router does not have a PIT entry for the data packet;
   extract the QoS information from the interest packet; and
   broadcast the data packet on downstream interfaces of the ICN router in accordance with the QoS information.

9. A method of Information Centric Network (ICN) packet transmission control, the method comprising:
- receiving, at an ICN router, an interest packet that includes quality of service (QoS) information;
- creating an entry for the interest packet in a pending interest table (PIT) of the ICN router;
- determining that the ICN router does not have a forward route for the interest packet in a forwarding information base (FIB) of the ICN router;
- extracting the QoS information from the interest packet; and
- broadcasting the interest packet on upstream interfaces of the ICN router in accordance with the QoS information, wherein broadcasting the interest packet in accordance with the QoS information includes:
  - placing multiple interest packets in a queue for transmission on the upstream interfaces;
  - sorting the multiple interest packets in the queue based on a priority from the QoS information; and
  - selecting the interest packet for broadcast when the interest packet is at a head of the queue.

10. The method of claim 9, wherein the QoS information is a portion of a header of the interest packet.

11. The method of claim 10, wherein the QoS information includes multiple fields encoded with a type-length-value (TLV) encoding.

12. The method of claim 11, wherein the multiple fields include at least two of the priority, timestamp, round-trip-time (RTT), or time to live (TTL).

13. The method of claim 12, wherein
- sorting the multiple interest packets in the queue based on the priority includes sorting among interest packets of a same priority in the queue based on TTL.

14. The method of claim 9, wherein an internal queue is maintained for each priority in the queue.

15. The method of claim 14, wherein the head of the queue is selected among heads of the internal queues.

16. The method of claim 9 comprising:
- receiving, at the ICN router, a data packet that includes quality of service (QoS) information;
- determining that the ICN router does not have a PIT entry for the data packet;
- extracting the QoS information from the interest packet; and
- broadcasting the data packet on downstream interfaces of the ICN router in accordance with the QoS information.

17. At least one non-transitory machine-readable medium including instructions for Information Centric Network (ICN) packet transmission control, the instructions, when executed by processing circuitry, cause a network router to perform ICN operations comprising:
- receiving an interest packet that includes quality of service (QoS) information;
- creating an entry for the interest packet in a pending interest table (PIT) of the ICN router;
- determining that the ICN router does not have a forward route for the interest packet in a forwarding information base (FIB) of the ICN router;
- extracting the QoS information from the interest packet; and
- broadcasting the interest packet on upstream interfaces of the ICN router in accordance with the QoS information, wherein broadcasting the interest packet in accordance with the QoS information includes:
  - placing multiple interest packets in a queue for transmission on the upstream interfaces;
  - sorting the multiple interest packets in the queue based on a priority from the QoS information; and
  - selecting the interest packet for broadcast when the interest packet is at a head of the queue.

18. The at least one non-transitory machine-readable medium of claim 17, wherein the QoS information is a portion of a header of the interest packet.

19. The at least one non-transitory machine-readable medium of claim 18, wherein the QoS information includes multiple fields encoded with a type-length-value (TLV) encoding.

20. The at least one non-transitory machine-readable medium of claim 19, wherein the multiple fields include at least two of the priority, timestamp, round-trip-time (RTT), or time to live (TTL).

21. The at least one non-transitory machine-readable medium of claim 20, wherein
- sorting the multiple interest packets in the queue based on the priority includes sorting among interest packets of a same priority in the queue based on TTL.

22. The at least one non-transitory machine-readable medium of claim 17, wherein an internal queue is maintained for each priority in the queue.

23. The at least one non-transitory machine-readable medium of claim 22, wherein the head of the queue is selected among heads of the internal queues.

24. The at least one non-transitory machine-readable medium of claim 17 wherein the operations comprise:
- receiving a data packet that includes quality of service (QoS) information;
- determining that the ICN router does not have a PIT entry for the data packet;
- extracting the QoS information from the interest packet; and
- broadcasting the data packet on downstream interfaces of the ICN router in accordance with the QoS information.

\* \* \* \* \*